UNITED STATES PATENT OFFICE.

AUGUSTO PASSALACQUA, OF PARIS, FRANCE.

SOLDERING OF ALUMINUM.

1,402,644. Specification of Letters Patent. Patented Jan. 3, 1922.

No Drawing. Application filed September 23, 1920. Serial No. 412,125.

*To all whom it may concern:*

Be it known that I, AUGUSTO PASSALACQUA, an Italian subject, and resident of Paris, France, have invented a new and useful Soldering of Aluminum, which improvements are fully set forth in the following specification.

The object of the present invention is a process of soldering aluminum which is effected in the following manner:

First of all a paste is prepared consisting of a mixture of linseed oil, olive oil, resin, paraffin, solid fat. Any proportions may be used for compounding this mixture, which is effected in the warm. By way of example the following proportions may be used:

| | |
|---|---|
| Linseed oil | 231 grams. |
| Olive oil | 231 grams. |
| Resin | 231 grams. |
| Paraffin | 231 grams. |
| Solid fat | 76 grams. |

This paste is placed in a tin and stored. It constitutes what may be called "paste A".

On the other hand a solution is prepared, in the cold, of:

Nickel sulphate, ammonium chloride, sodium pyrophosphate and distilled water. Any proportions may be used for this mixture. In practice by way of example the following may be indicated:

| | |
|---|---|
| Nickel sulphate | 40 grams. |
| Ammonium chloride | 20 grams. |
| Sodium pyrophosphate | 2 grams. |
| Distilled water | 1000 grams. |

This solution constitutes what may be called "solution B".

Thereupon a solution of the following is prepared in the cold: Stannous chloride, sodium pyrophosphate, citric acid and distilled water. Any proportions may be used for this mixture. By way of example the following may be given:

| | |
|---|---|
| Stannous chloride | 2 grams. |
| Sodium pyrophosphate | 20 grams. |
| Citric acid | 2 grams. |
| Distilled water | 1000 grams. |

This solution constitutes what may be called "solution C".

The aluminum parts which have to be soldered are first very carefully cleaned with emery- or glass paper. Thereupon 1 gram of solution B is mixed with 1 gram of solution C and 50 grams of the prepared paste A in the warm. This mixture is effected in the warm so as to form a liquid product, and the surfaces to be soldered are coated with this liquid product. The edges are thereupon soldered with pure tin by means of a soldering iron in the same way as in ordinary tin soldering. In this way a very adherent soldering is obtained. This process may be applied to any alloys of aluminum.

It should be noted that in certain cases, and especially when the kind of joint described above is immersed in water a separation of the solder occurs in consequence of the formation of aluminum oxide. It is, therefore, indispensable before proceeding with the soldering to clean the aluminum pieces by using one or the other of the mixtures mentioned below.

Any proportions may be used for the composition of these mixtures, which should be used in the cold.

By way of example the following proportions may be indicated:

1st mixture:

| | |
|---|---|
| Sodium sulphite | 50 grams. |
| Sodium phosphate | 30 grams. |
| Potassium chloride | 30 grams. |
| Sodium hydrate | 50 to 200 grams. |
| Water | 1000 grams. |

2nd mixture:

| | |
|---|---|
| Potassium iodide | 50 grams. |
| Potassium carbonate | 30 grams. |
| Sodium hyposulphite | 20 grams. |
| Sodium hydrate | 50 to 200 grams. |
| Water | 1000 grams. |

One or the other of these solutions is applied, in the cold to the pieces to be soldered, and left for ten to twelve minutes. In this way the aluminum oxide occluded in the aluminum is eliminated. The pieces are then washed with cold water and are soldered in accordance with the process described.

In the composition of the prepared paste A mentioned above it is useful to introduce stearic acid in the proportion of 231 grams.

What I claim and desire to secure by Letters Patent of the United States is:

1. A composition for use in soldering aluminum with pure tin, comprising linseed oil, olive oil, resin, paraffin and solid fat.

2. A composition for use in soldering aluminum with pure tin, comprising nickel sulphate, ammonium chloride and sodium pyrophosphate.

3. A composition for use in soldering aluminum with pure tin, comprising stannous chloride, sodium pyrophosphate and citric acid.

4. A composition for use in soldering aluminum with pure tin, comprising a mixture of an aqueous solution containing nickel sulphate, ammonium chloride and sodium pyrophosphate and an aqueous solution containing stannous chloride, sodium pyrophosphate and citric acid.

5. A composition for use in soldering aluminum with pure tin, comprising linseed oil, olive oil, resin, paraffin and solid fat, and a mixture of an aqueous solution containing nickel sulphate, ammonium chloride and sodium pyrophosphate and an aqueous solution containing stannous chloride, sodium pyrophosphate and citric acid.

In testimony whereof I have signed this specification in the presence of two subscribing witnesses.

AUGUSTO PASSALACQUA.

Witnesses:
JULES ZOUSSET,
RENE SANGIORGIO.